Patented Feb. 20, 1923.

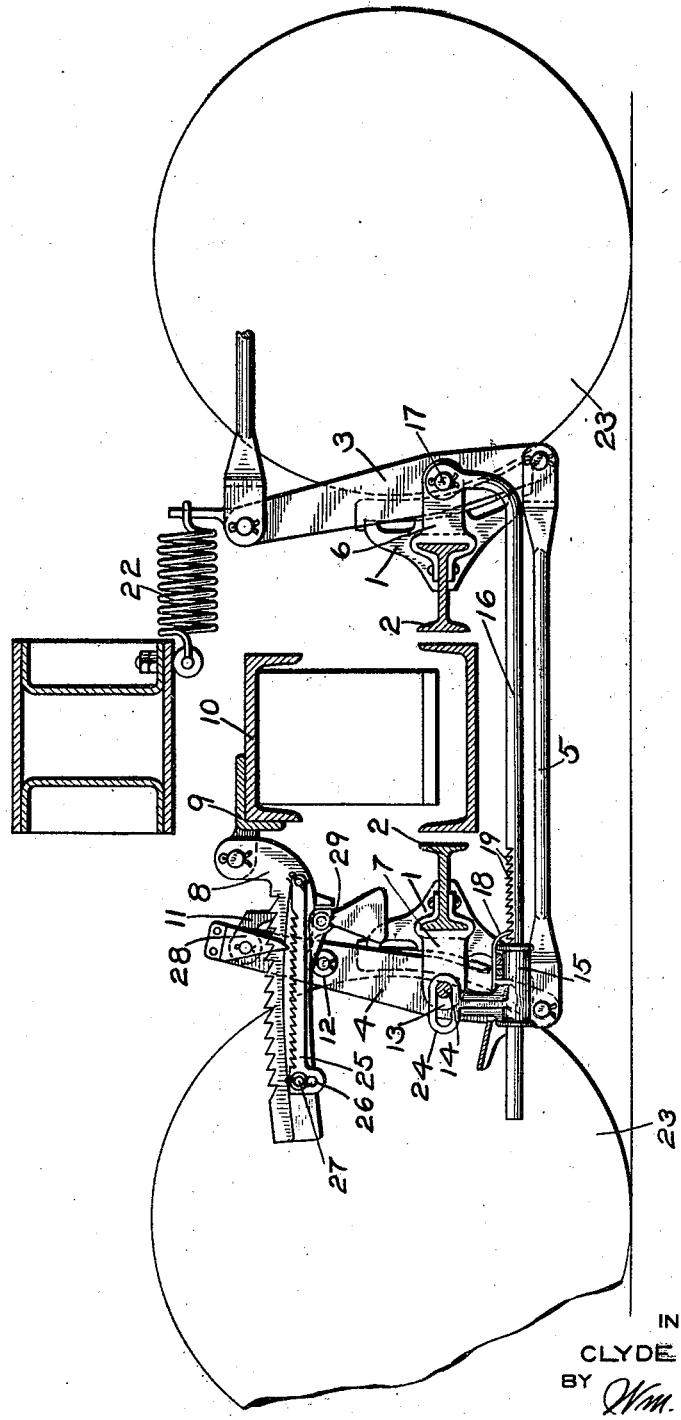

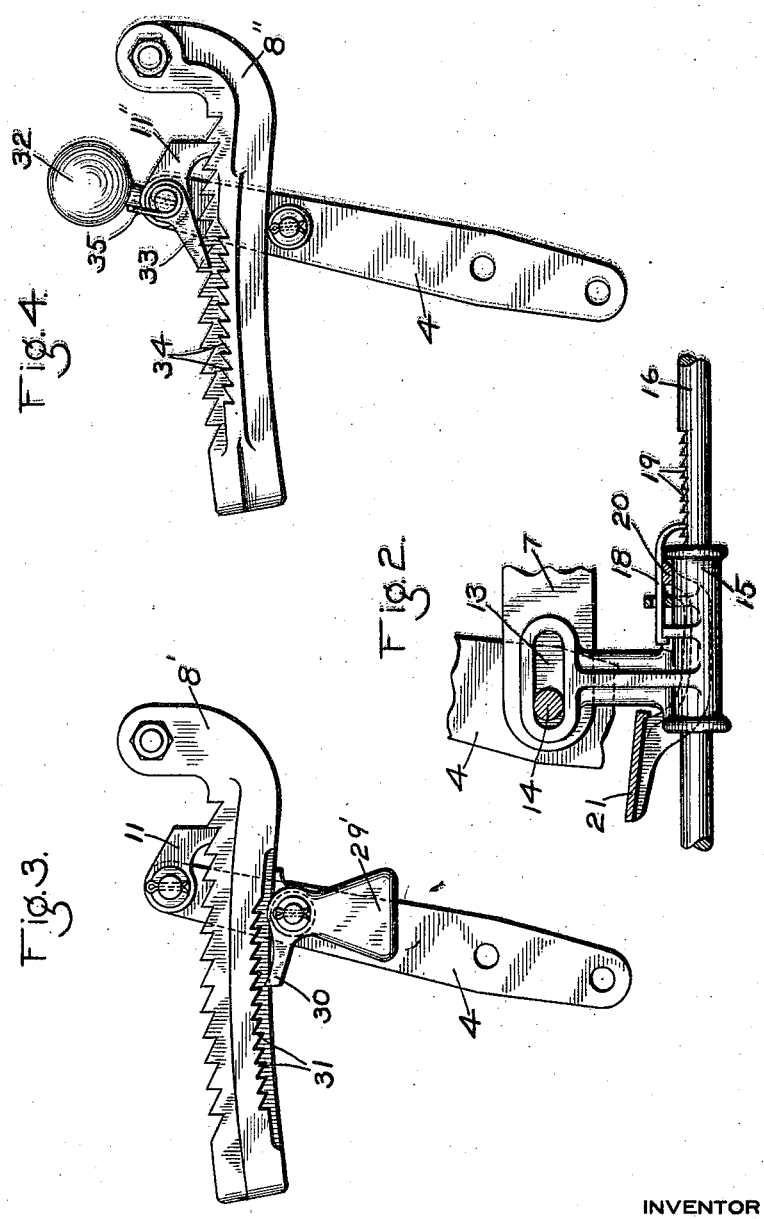

1,446,168

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SLACK ADJUSTER.

Application filed December 28, 1921. Serial No. 525,400.

*To all whom it may concern:*

Be it known that I, CLYDE C. FARMER, a citizen of the United States, residing at Pittsburgh, in the county of Allegheny and State of Pennsylvania, have invented new and useful Improvements in Slack Adjusters, of which the following is a specification.

This invention relates to slack adjusters for automatically taking up slack due to the wear of the brake shoes on the car wheels.

With certain otherwise desirable types of brake slack adjusters, it has been found that the movable members of the slack adjuster are liable to be operated when not intended by the momentum of the parts, due to the application of a sudden force to the car, such as may occur in switching and in making up trains and the like, so that an excessive amount of slack is taken up.

The principal object of my invention is to provide means for preventing the accidental operation of the slack adjuster under the above conditions.

In the accompanying drawing; Fig. 1 is a vertical central section of a car truck with my improved slack adjuster applied thereto; Fig. 2 an enlarged detail view of a portion of the take-up mechanism; Fig. 3 an elevational view illustrating a modified form of my invention; and Fig. 4 a similar view of another modified form of my invention.

In Fig. 1 of the drawings is shown the usual car brake mechanism comprising brake shoes 1 carried by brake beams 2, a live brake lever 3, operatively connected to the brake cylinder (not shown), and a dead lever 4, pivotally connected to the live lever by a rigid rod 5, the brake beams being pivotally connected to the levers 3 and 4 by lugs 6 and 7 respectively.

The slack adjuster comprises a ratchet bar 8, pivotally supported by a bracket 9, secured to the bolster 10, and pivoted to the dead lever 4 is a pawl 11 adapted to engage the teeth of the rachet bar 8, the under side of the bar 8 being adapted to rest on a roller 12 secured to the lever 4. A sleeve 15 is mounted on an adjusting rod 16, having its opposite end pivotally secured to the pivot pin 17 of the live lever 3. Secured to the sleeve 15 is a detent 18 adapted to engage teeth 19 cut on the rod 16 and carried by the sleeve 15 is a lug 24, having an elongated slot 13 through which the pivot pin 14 extends.

For manually adjusting the sleeve 15, a rocking member 20 is mounted on the sleeve and projects under the detent 18, so that by operating the finger piece 21, the detent 18 may be raised out of engagement with the teeth 19. A release spring 22 connected to a fixed portion of the car truck is attached to a projecting portion of the live lever 3.

The operation of the slack adjuster as so far described is as follows: When the brakes are applied by operation of the brake cylinder in the usual way, the live lever 3 is moved against the resistance of the spring 22. The lower ends of the levers 3 and 4 being maintained at a constant distance apart by the rod 5, the brake beams 2 are separated, causing the brake shoes 1 to be applied to the car wheels 23.

The pivot pins 14 and 17 are thus separated, and in the normal operation of the brake, the amount of separation is just equal to the length of the slot 13. When, due to wear of the brake shoes, the movement exceeds the normal amount, the pin 14 will engage the end of the slot 13 and move the sleeve 15 along the rod 16, the distance of one or more teeth 19. When the live lever 3 assumes its normal position upon release of the brakes, the detent 18 will prevent return movement of the sleeve, and the pin 14 finally engaging the opposite end of the slot 13 will cause a movement of the dead lever 4 and the pawl 11 over one or more of the teeth on the ratchet bar 8, to complete the operation of taking up slack.

According to my invention, in order to prevent accidental movement of the dead lever 4 and the pawl 11 from taking up slack through momentum action of the parts, when the car is subjected to sudden shocks, as shown in Fig. 1, a toothed bar 25 may be pivotally mounted at one end on the ratchet bar 8, the other end of the bar having an elongated slot 26 in which projects a pin 27, secured to the ratchet bar 8. A pawl 28 is secured to the outer end of the dead lever 4 and when the bar 25 is moved upwardly on its pivot, the pawl is adapted to engage the teeth of the bar 25. Below the bar 25, a weighted ratchet arm 29 is pivotally mounted on the bar 8 and engages the under side of said bar.

In operation, when the car is subjected to a severe shock, in the direction tending to shift the lever 4 and the pawl 11 along the teeth on the ratchet bar 8, the weighted arm 29 will swing on its pivot through its momentum, and act on the bar 25, so as to lift the same and cause engagement of the pawl 28 with the teeth on the bar. Slack adjusting movement of the lever 4 and the pawl 11 is thus prevented and the parts remain in their normal positions of adjustment.

In Fig. 3, a slightly modified form of my invention is shown, in which a weighted arm 29', pivotally mounted on the lever 4, is provided with a pawl or detent 30 adapted to engage teeth 31, cut or cast in the side face of the bar 8'. Upon a sudden change in velocity of the car, in a direction tending to cause the pawl 11 to move along the teeth of the bar and take up slack, the inertia of the arm 29' will effect the swinging movement of the arm, so that the detent 30 will engage one of the teeth 31 and thus prevent the take-up movement of the lever 4 and the pawl 11.

Another form of the invention is shown in Fig. 4, in which an additional pawl or detent 33, having a weighted arm 32 associated therewith, is adapted to engage teeth 34 cut in the bar 8'', a coil return spring 35 tending to hold the pawl 33 out of engagement with the teeth 34 on the bar 8''. When the car is subjected to a shock, the inertia of the weight 32 causes movement of the detent 33 so that the detent will engage the teeth 34 of the bar 8'' and thus prevent movement of the lever 4 and the pawl 11' to take up slack.

Having now described my invention, what I claim as new and desire to secure by Letters Patent, is:—

1. The combination with a brake slack adjuster, of means operated by momentum for preventing accidental operation of the slack adjuster to take up slack.

2. The combination with a brake slack adjuster, of means operative upon a sudden change in velocity of the car for preventing the operation of the slack adjuster to take up slack.

3. The combination with a brake slack adjuster, of means operative by momentum upon an abrupt change in velocity of the car for locking the slack adjuster against operation to take up slack.

4. In a brake slack adjuster, the combination with a ratchet bar and a pawl engaging the teeth of the ratchet bar to take up slack, of an additional pawl and ratchet operated by momentum to prevent the operation of the slack adjuster to take up slack.

5. In a brake slack adjuster, the combination with a ratchet bar and a pawl engaging the teeth of the ratchet bar to take up slack, of additional ratchet teeth associated with said bar, a detent for engaging said teeth to oppose movement of the pawl on the ratchet bar, and means operated by momentum for causing engagement between the detent and said teeth.

6. In a brake slack adjuster, the combination with a ratchet bar, a brake lever, and a pawl carried by said lever for engaging the ratchet teeth of the bar to take up slack, of additional ratchet teeth associated with said bar and a weighted detent operable by momentum for engaging the additional ratchet teeth to prevent movement of said pawl to take up slack.

7. In a brake slack adjuster, the combination with a ratchet bar, a brake lever, and a pawl carried by said lever for engaging the ratchet teeth of the bar to take up slack, of additional ratchet teeth associated with said bar and a weighted detent pivotally mounted on the brake lever and movable by momentum to engage the additional ratchet teeth to prevent relative movement of the pawl to take up slack.

In testimony whereof I have hereunto set my hand.

CLYDE C. FARMER.